United States Patent [19]
Schultheis et al.

[11] Patent Number: 5,584,957
[45] Date of Patent: Dec. 17, 1996

[54] PROCESS FOR FORMING A PERMANENTLY ELASTIC ADHESIVE CONNECTION EASILY DETACHABLE IN CASE OF DISASSEMBLY

[75] Inventors: Bernd Schultheis, Schwabenheim; Stefan Hubert, Bubenheim; Roland Leroux, Stadecken-Elsheim; Jürgen Thürk, Schornsheim; Kurt Schaupert, Hofheim-Wallau; Werner Noky, Mainz, all of Germany

[73] Assignee: Schott Glaswerke, Germany

[21] Appl. No.: 291,794

[22] Filed: Aug. 16, 1994

[30] Foreign Application Priority Data

Aug. 16, 1993 [DE] Germany ............... 43 27 475.7

[51] Int. Cl.⁶ .................. B29C 65/52; B29C 65/76; F24C 15/10
[52] U.S. Cl. .................. 156/289; 156/108; 156/329; 126/211; 428/192; 427/207.1; 427/259; 427/284; 427/299
[58] Field of Search .................. 156/108, 289, 156/329, 310, 303.1, 306.3, 344, 276, 293, 315, 314; 126/211; 428/192, 195, 210; 296/218, 96.22, 84.1; 427/208.8, 416, 387, 299, 300, 284, 259, 207.1, 407.1; 52/208; 264/261, 263

[56] References Cited

U.S. PATENT DOCUMENTS

| 3,554,835 | 1/1971 | Morgan | 156/289 X |
| 3,788,941 | 1/1974 | Kupits | 156/274 X |
| 3,803,068 | 4/1974 | Mestetsky et al. | 156/289 x |
| 3,837,963 | 9/1974 | Frauenglass et al. | 156/310 |
| 4,453,533 | 6/1984 | Scheidler et al. | 126/211 |
| 4,492,217 | 1/1985 | Scheidler | 126/39 B |
| 4,735,837 | 4/1988 | Miyasaka et al. | 428/192 X |
| 5,061,332 | 10/1991 | Stolz et al. | 156/108 X |
| 5,126,001 | 6/1992 | Hanlon et al. | 156/289 |
| 5,185,047 | 2/1993 | Ray | 126/211 X |
| 5,217,552 | 6/1993 | Miyajima et al. | 156/71 |

FOREIGN PATENT DOCUMENTS

| 2063633 | 7/1972 | Germany. |
| 2850611 | 6/1979 | Germany. |
| 2856517 | 7/1979 | Germany. |
| 2855388 | 7/1979 | Germany. |
| 3104114 | 8/1982 | Germany. |
| 2006764 | 6/1983 | Germany. |

Primary Examiner—Michael W. Ball
Assistant Examiner—Francis J. Lorin
Attorney, Agent, or Firm—Millen, White, Zelano, & Branigan, P.C.

[57] ABSTRACT

A process for forming a permanently elastic adhesive connection, easily detachable in the case of disassembly, especially adhesive connections made of temperature-stable silicone compounds, between a plate made of glass, glass ceramic or a similar material, from a holding frame on which the plate rests. In particular, the process can be used to provide such an adhesive connection between a cooking surface in a recess of a working surface, wherein a sealing frame, supported by its edge, is arranged in the recess, and a holding frame connected with the sealing frame, on which the plate rests. The adhesive strength between the permanently elastic adhesive connection and the parts of the plate in contact therewith is adjusted by the use of separating agents.

11 Claims, 2 Drawing Sheets

PROCESS FOR FORMING A PERMANENTLY ELASTIC ADHESIVE CONNECTION EASILY DETACHABLE IN CASE OF DISASSEMBLY

SUMMARY OF THE INVENTION

The invention relates to a process for forming a permanently elastic adhesive connection, easily detachable in case of disassembly, especially an adhesive connection made of temperature-stable silicone compounds, between a plate made of glass, glass ceramic or a similar material and a frame in which the plate is mounted. In particular, the invention relates to the connection between a plate used as a cooking surface and the surrounding frame, which in turn is mounted in a cut-out in the countertop and sealed to this.

Permanently elastic connections between glass, glass ceramic or similar brittle materials and objects made of the same or different materials are now usually made with silicone adhesives such as Pactan® 6096 from Heidelberger Baustofftechnik GmbH, D-83301, Traunreut, Germany.

In particular, glass ceramic cooking surfaces are glued permanently elastically into frames by means of especially temperature-stable silicone adhesives. Generally, plastic-coated metal frames or stainless steel frames are used as holding frames and sealing frames.

From U.S. Pat. No. 4,492,217, a heatable surface, especially a cooking surface, made of a glass or glass ceramic plate, which is connected with a frame by a permanently elastic heat-resistant adhesive, is known. The frame consists of two parts, of which the first acts as a decorative frame visible to the user and the second as a holding structure for the glass ceramic plate. The plate is permanently bonded to both frame parts using a highly temperature-stable silicone glue.

This type of adhesive bond has previously proven itself very well in practice. But, if service is required, replacement of a defective cooking surface is a time-consuming task and thus expensive. For disassembly, the cooking surface must be laboriously cut from the adhesive bond.

Also, for subsequent recycling of the components, a clean, easy and economical separation of the cooking surface from the frame is necessary. But, with the present type of adhesive bond, separation of the cooking surface from the frame is only possible at considerable expense.

Further, cooking surface-frame designs are known in which the cooking surface is fastened within the frame with a circumferential U-shaped rubber profile. These frame types, so-called overlapping frames, permit a relatively simple/economical disassembly. However, they have the drawback of being greatly limited with respect to design. They always use a frame part (see (6) of FIG. 1b) extending over the upper surface of the cooking surface and thus have a larger thickness above the cooking surface, which hampers easy cleaning. Here a completely different frame design is required which is not compatible with existing flat profile frames.

A frame design for a plate made of glass, glass ceramic or similar material, especially for a cooking surface, is known from U.S. Pat. No. 4,453,533. A two-part frame is used, with one part acting as a decorative frame visible to the user and the second as a holding frame for the glass ceramic plate. The plate is permanently glued to the holding frame, whereas it can be press-fitted to the decorative frame. The decorative frame and holding frame are detachably connected with one another by at least one fastening element, and the seal between the plate and decorative frame is detachably connected with the decorative frame.

For this construction, special and very expensive frame designs are required.

It is also known from U.S. Pat. No. 4,453,533 to provide the decorative frames with a separating layer, so that the cooking surface, with an adhesive applied to the edge thereof, can be pushed out of the frame. But, the adhesive adhering to the glass ceramic cooking surface prevents problem-free reusability of the cooking surface.

The object of the invention is therefore to provide a permanently elastic connection between glass, glass ceramic as well as other brittle materials and frame materials, which permits easy disassembly of these materials from a general arrangement thereof in such a manner that the glass, glass ceramic and other brittle materials are obtained in a substantially pure form, e.g., uncontaminated and free of adhesions of other materials.

A further object of the invention is to achieve cooking surface-frame bonds which are especially capable of being used with the previously known typical frame systems without any change of the design.

Upon further study of the specification and appended claims, further objects and advantages of this invention will become apparent to those skilled in the art.

These objects are achieved by adjusting the adhesive strength of the bond between the permanently elastic adhesive connection and the parts of the plate that are in contact therewith by the use of separating agents. As a result of the use of these separating agents, the adhesion of the adhesive onto the glass ceramic plate, e.g., a cooking surface, is discretely reduced.

Numerous tests have documented that the safety and use requirements of the cooking surfaces are not adversely affected.

The adhesives now used achieve an adhesive strength of more than $1 N/mm^2$.

Due to the large circumferential surface to which an adhesive is applied in existing bonds—in the support areas and on the vertical sides of the plate, typically 200 to 300 $cm^2$—the adhesive forces achieved are, by far, greater than the stresses that actually occur as a result of different thermal expansions, as well as mechanical stresses, such as, e.g., impact stresses.

According to the invention, adhesive strengths are produced, which still exhibit a large safety margin in the case of thermal and mechanical stresses. Thus, safety and serviceability continue to be present.

Preferred separating agents include silicone separating agents; waxes, especially natural and montan waxes; oils, especially fatty oils, stand oils or spray oils based on mineral oils; fats; resins, natural and synthetic; varnishes, e.g., lubricating varnishes; surfactants, especially anionic or non-ionic; alcohols, especially polyalcohols such as polyethylene glycol (PEG), glycerol, fatty alcohols; siccatives; pigments; fibers, especially plastic fibers, whiskers; polyolefins, especially polyethylene, halogenated polyethylene, polypropylene; and soaps, especially as 2–5% soap suds.

It is common to these separating agent coatings that they convert the glass surface to a low-energy surface. As a result, the adhesion of the adhesive is discretely reduced.

The separating agent coating contains materials that do not interfere with the optical properties of the glass or glass ceramic surface. Further, since the agents are used in small amounts, the separating agent coating does not influence remelting of the cooking surface. Self-adhesive, temperature-stable separating films (e.g., acrylate films) also can be applied to the cooking surface as separating agents before the bonding of the adhesive connection. After the disassembly, these separating films can be removed again relatively simply.

Further, adhesive systems with low bonding strength can be used without modification of the cooking surface. Suitable adhesive systems for this embodiment are those which require an adhesion promoter (primer) and which are otherwise only slightly adhesive to glass/glass ceramic surfaces because of their composition. Such adhesive systems are already on the market. The adhesive forces can be specifically adjusted in this embodiment by partial application of the related primer.

According to another preferred embodiment, the vertical edge of the cooking surface and/or underside of the cooking surface in the edge area is provided with a varnish layer, especially an oil varnish layer. On the one hand, this varnish layer exhibits a good adhesion to the glass/glass ceramic. On the other hand, the previously mentioned typical silicone adhesives also adhere well to this varnish layer.

The varnish layer should be selected with respect to its temperature stability, so that it withstands temperature stresses of up to about 180° C. which occur during use of the cooking surface. The properties of the varnish layer only clearly change above this temperature.

For the disassembly, only the cooking surface-frame bond then needs to be kept at a higher temperature, and the silicone then is detached from the cooking surface.

The oil varnish can be formed here from, for example, wood oil, linseed oil, tall oil or perilla oil. Other possible heat-sensitive separating agents are polyester or acrylic resin varnishes, cellulose nitrate lacquers, vinyl polyethylene varnishes, epoxide resin varnishes, PU-based enamels (PU = polyurethane), melamine varnishes, urea with phenol resin, chlorinated rubber lacquers, black varnishes or asphalt and bitumen.

For example, tests with a spray varnish, sprayed onto the cooking surface as described above and then dried in air, showed that the glued cooking surface-frame bond separated after 30 minutes at 300° C. for disassembly.

It is especially advantageous if the underside coating, which is typically applied to the plate as a scattered light covering, generally a layer based on a resinate with inorganic components, is also used as the separating agent.

According to another embodiment of the invention, the separating agent is applied only to the underside of the plate, leaving open the vertical edge.

This is especially advantageous since then an adhesive connection takes place only in the vertical edge area of the cooking surface, which is in general easily accessible for the disassembly by means of cutting tools.

The configuration in which the separating layer is applied to the underside (about 10 mm circumferentially) and partially to the edge is also advantageous. In the edge area, still a sufficiently strong connection is achieved.

For the disassembly, this has the advantage that the bond, easily accessible from above, can be cut open using only a sharp knife or scalpel. The cooking surface can then be removed from the cooking surface-frame bond with relatively low expenditure of force, e.g., pushed out of the frame from below, or lifted upward with a vacuum suction device. Optionally, mechanical auxiliary agents, for example, a hydraulic press, can also be used for this purpose.

In this case, the separating agents can be applied partially, especially dotlike and at points hard-to-get-at in the disassembly, such as in the corner areas.

In addition, the adhesive strength between the permanently elastic adhesive connection and the frame parts in contact therewith can also be adjusted by the use of separating agents.

It is especially advantageous if the upper part of the frame of a two-part frame system, as it is described in DE 31 26 013 C2, is combined with the process described above. This has the advantage that a cooking surface to be exchanged, which is glued in the upper part of the frame in the above-mentioned way, can be replaced quickly and economically for on-site service by another cooking surface, which is already glued in a replacement-frame upper part.

In the case of aftersales service, the cooking surface to be exchanged can be cut out of the upper part of the frame optionally with the above-mentioned auxiliary devices.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following, all temperatures are set forth uncorrected in degrees Celsius.

The entire disclosure of all applications, patents and publications cited above and below and of corresponding German Application P 43 27 475.7, filed Aug. 16, 1993 (published Feb. 23, 1995), are hereby incorporated by reference.

The invention is explained in more detail below based on the figures and an embodiment presented on it.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

Figure 1A:
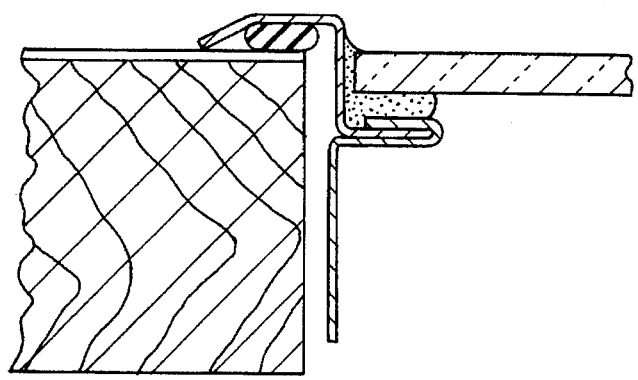
FIGS. 1a, 1b, and 1c illustrate prior art methods of fixing a glass ceramic cook-top panel in worktops.
Figure 1B:
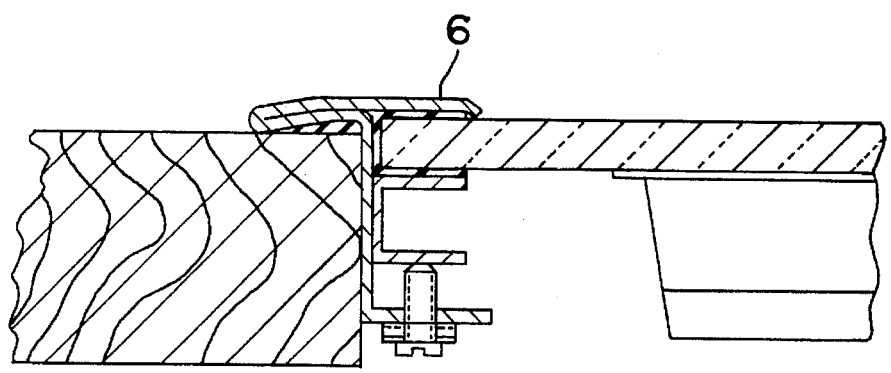
Figure 1C:
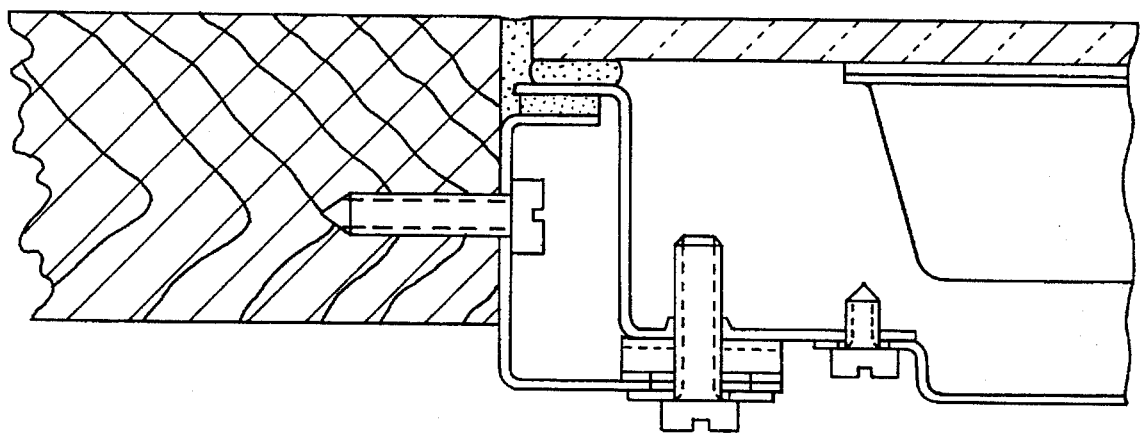

Previously known methods for fixing a glass-ceramic cooking surface within countertops are shown in FIGS. 1a–1c. In FIG. 1a, the glass ceramic plate is bedded in an adhesive sealant. FIG. 1b illustrates an embodiment wherein the glass ceramic plate is clamped in a frame with a circumferential U-shaped rubber profile. In the embodiment of FIG. 1c, the glass ceramic plate is bedded in a worktop without frame.

Figure 2:
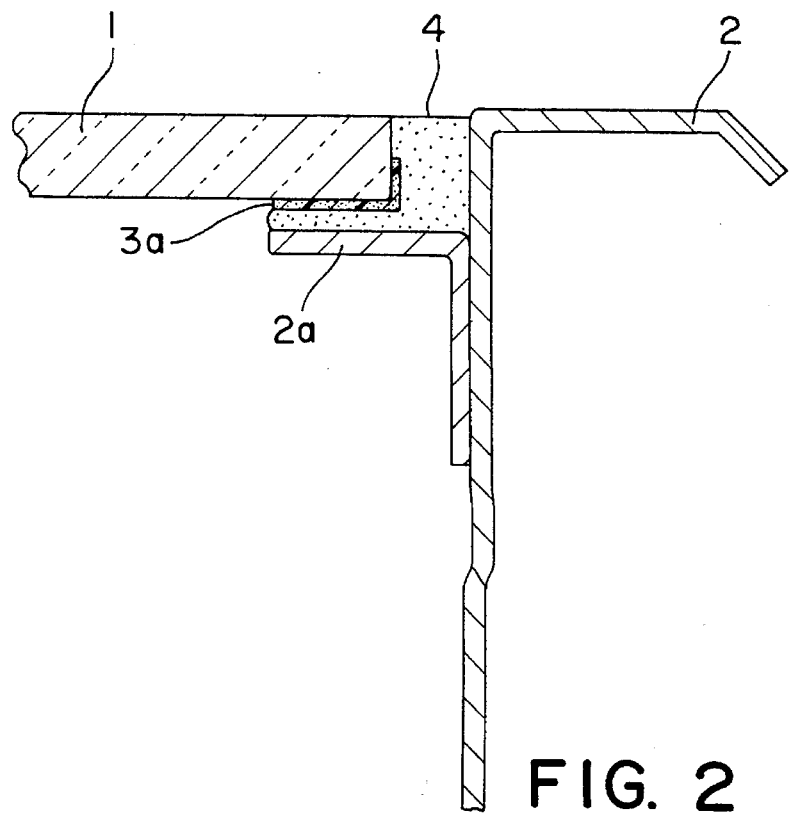
FIG. 2 illustrates a cross-section of a cooking surface-frame bond according to the invention, with separating layer.

FIG. 2 shows a decorative frame (2), made of, e.g., stainless steel, powder-coated high-grade steel, enameled sheet steel or aluminum diecasting, and a holding frame (2a) connected with it. For glass ceramic cooking surfaces (1), frame (2) typically has dimensions from about 270×270 mm up to about 900×560 mm.

Separating layer (3a) is applied circumferentially in a width of about 10 mm to the underside and partially also to the edge area of plate (1). As separating agent, a self-adhesive separating film made of acrylate is applied in this case to the underside of plate (1), while in the edge area, plate (1) is treated partially with a spray oil based on mineral oils.

The thus-prepared plate (1) is then put into the frame (2/2a) which is provided in advance with a 1–2 mm thick layer of a silicone adhesive (4) and centered, so that, circumferentially, a uniformly wide space remains between plate (1) and frame (2), preferably 2.5±1 mm wide. This space then is filled by means of the permanently elastic silicone adhesive.

For disassembly, only the areas of strongly adhesive, permanently elastic connection must now be cut through, e.g., with a sharp knife, and for this purpose, the vertical edge of plate (1) is advantageously used as a guide.

The adhesive strength between the underside of plate (1) and the adhesive (4) is reduced according to the invention by the "separating agent," i e. the acrylate film, to the extent that plate (1) can be lifted out or pushed from the silicone bed glued to holding frame (2a) with only little effort.

Figure 3:
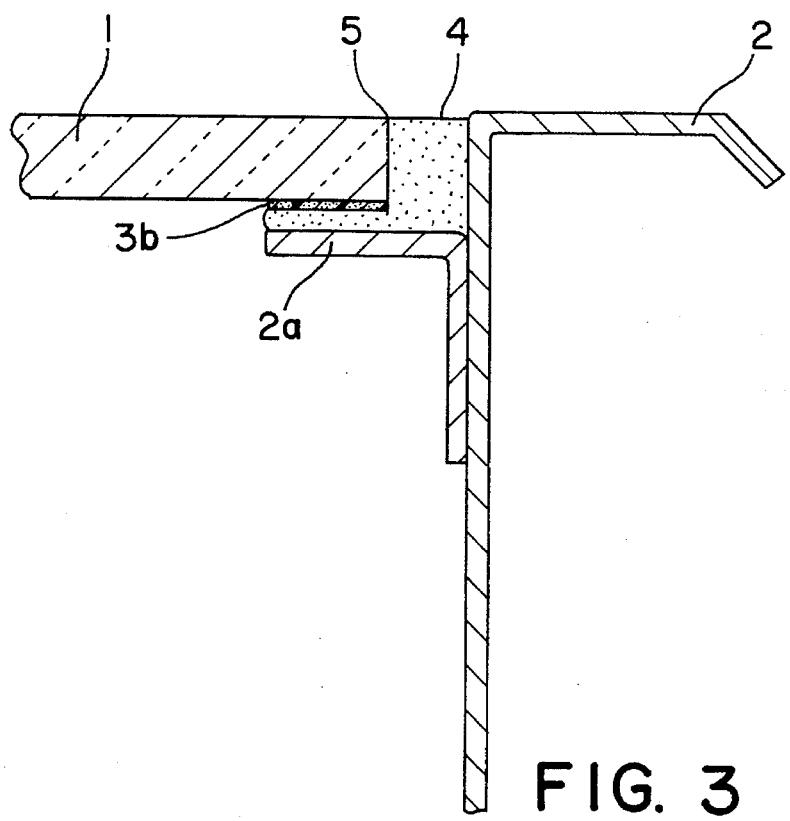
FIG. 3 illustrates another embodiment of the invention in which a strong adhesive connection is provided only in the area vertical of the cooking surface edge.

FIG. 3 shows another embodiment with a strong connection of permanently elastic adhesive (4) only in the area of the vertical edge of the cooking surface.

The area 3b of the underside of cooking surface (1) which is in connection with the adhesive is completely provided with a separating agent, i.e., montan wax.

After plate (1) is separated along line (5) from the decorative frame (2), e.g., by means of a sharp blade, the plate can be raised problem-free with a vacuum suction device upward from the silicone material glued to holding frame (2a). Because of the separating agent, no permanent adhesion exists between the underside of plate (1) and silicone adhesive (4).

Advantages of this invention are:

The cooking surface is easily accessible and can always be detached and removed, easily and quickly, from the bond with the frame, by cutting from above the circumferential adhesive seam, as directly as possible, on the plate with a sharp knife, e.g., a carpet cutter or scalpel.

If the vertical edges of the plate still exhibit small residues of adhesive, the latter can be removed very easily by cutting off with the knife.

The frame can also be freed from adhesive after the disassembly of the plate in a simple way.

All existing and proven cooking surface-frame systems that are glued can continue to be used without any design change.

The possibility of a defined adhesive strength between plate and adhesive is made possible with optimal safety and serviceability.

The preceding can be repeated with similar success by substituting the generically or specifically described reactants and/or operating conditions of this invention for those used.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for forming a permanently elastic adhesive, easily detachable connection between a plate made of glass or glass ceramic, and a frame, on which said plate rests, wherein the adhesive strength of said connection is adjusted by a separating agent, said process comprising:

prior to forming said adhesive connection by application of an adhesive, applying said separating agent to those regions of the vertical edge of said plate and/or those regions of the bottom surface of said plate which are to contact said adhesive, and thereafter applying said adhesive to form said adhesive connection, wherein said plate is a cooking surface mounted in a frame which, in turn is mounted in a cutout in a countertop and sealed to said countertop.

2. A process according to claim 1, wherein said separating agent is applied partially to said bottom surface of said plate.

3. A process according to claim 1, wherein said separating agent is also applied to both said bottom surface and said vertical edge of said plate.

4. A process according to claim 1, wherein said separating agent is applied to said vertical edge of said plate.

5. A process according to claim 1, wherein an underside coating is applied to the bottom surface of said plate as a scattered light covering, and said underside coating is also applied to those regions of said plate which are to contact said adhesive connection, whereby said underside coating functions as said separating agent.

6. A process according to claim 1, wherein a release film is used as said separating agent.

7. A process according to claim 6, wherein said release film is a self-adhesive, temperature-stable acrylate film.

8. A process according to claim 1, wherein said separating agent is a silicone, wax, oil, fat, resin, varnish, surfactant, alcohol, siccative, pigment, fiber, polyolefin or soap.

9. A process according to claim 1, wherein a varnish is applied as said separating agent which, at temperatures up to 180° C., assures a bond of sufficient adhesive strength between the permanently elastic adhesive connection and the parts of the plate in contact therewith, but, at temperatures above 180° C., the properties of said varnish change and adhesion no longer is provided.

10. A process according to claim 1, wherein the adhesive strength between the adhesive connection and the frame parts in contact therewith is also adjusted by the use of a separating agent.

11. A process according to claim 1, wherein said permanently elastic adhesive connection is formed from a temperature-stable silicone compound.

* * * * *